July 21, 1959    V. J. TERRY ET AL    2,896,148
GENERATOR REGULATED POWER SUPPLY EQUIPMENT
Filed Nov. 1, 1954    4 Sheets-Sheet 1

Inventors
V. J. TERRY - R. KELLY -
P. S. KELLY - W. D. CRAGG

By Philip M. Bolton
Attorney

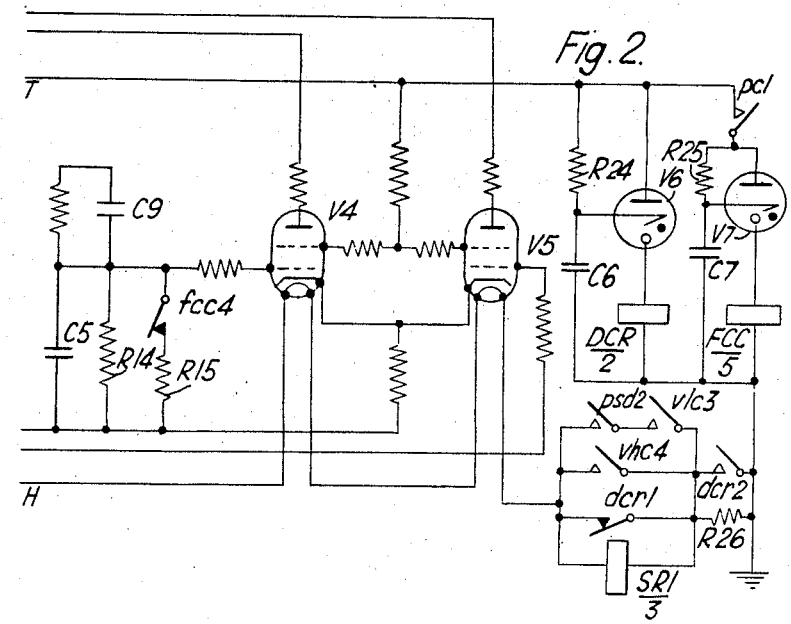
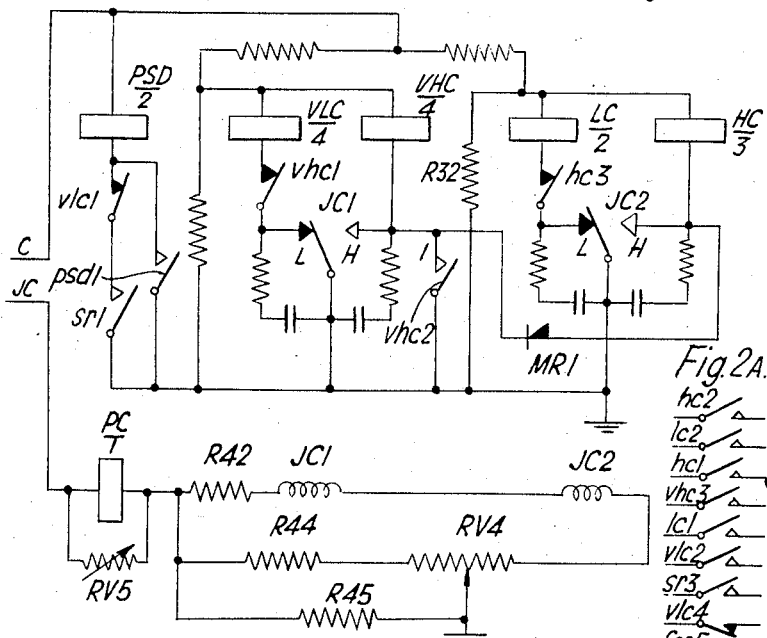
Fig. 2.
Fig. 2A.
Inventors
V.J. TERRY - R. KELLY -
P.S. KELLY - W.D. CRAGG
By Philip M. Bolton
Attorney

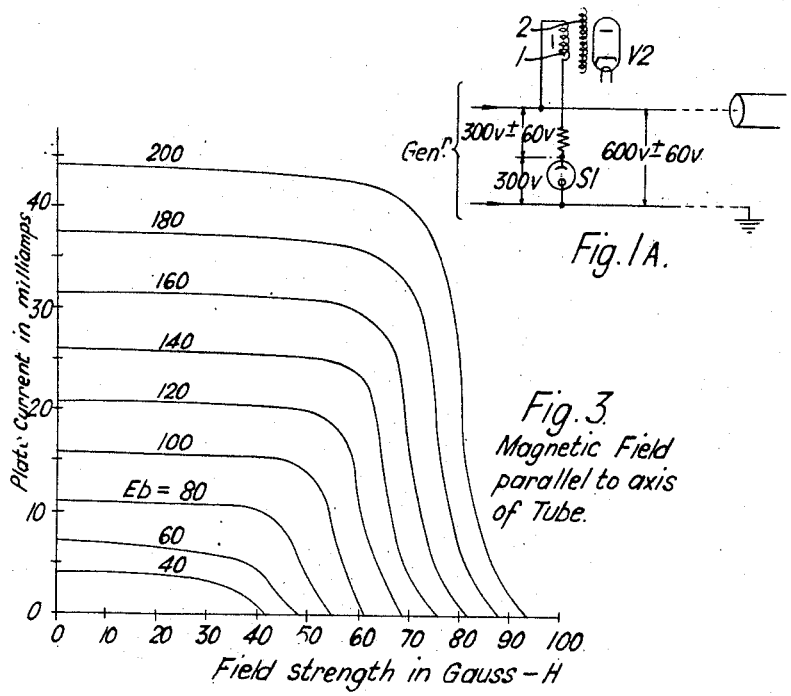
Fig. 1A.
Fig. 3.
Magnetic Field parallel to axis of Tube.
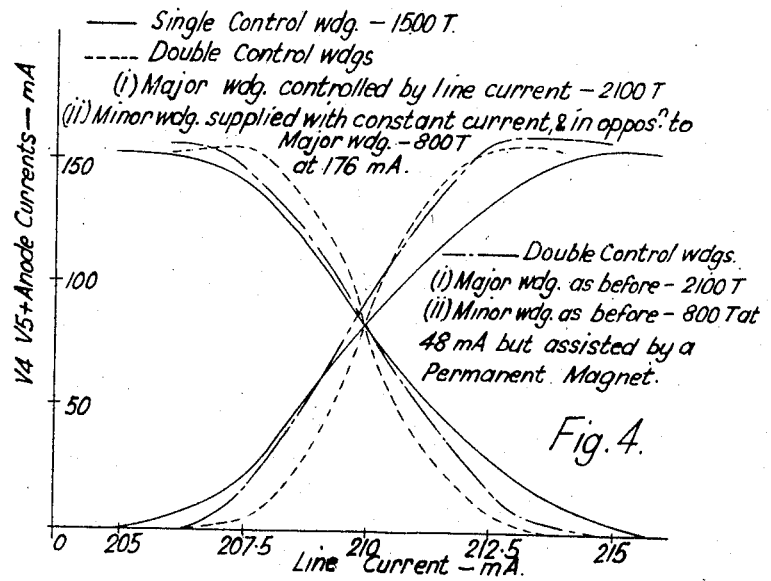
Fig. 4.

July 21, 1959  V. J. TERRY ET AL  2,896,148
GENERATOR REGULATED POWER SUPPLY EQUIPMENT
Filed Nov. 1, 1954  4 Sheets-Sheet 4
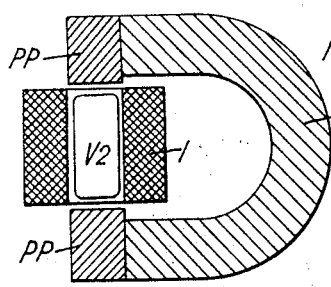
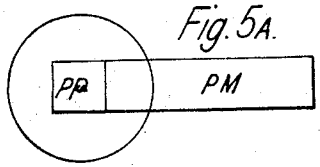
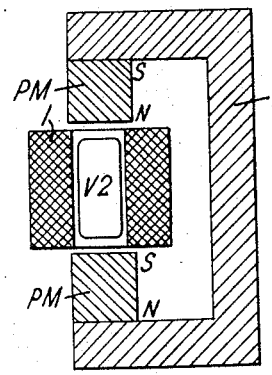
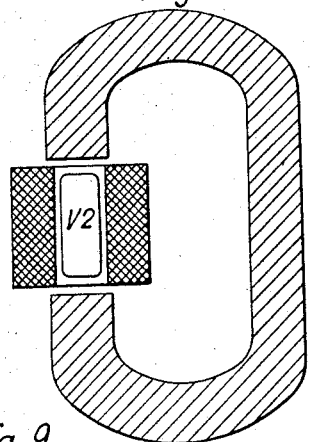
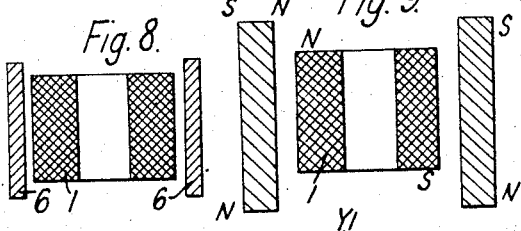
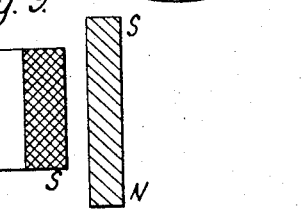
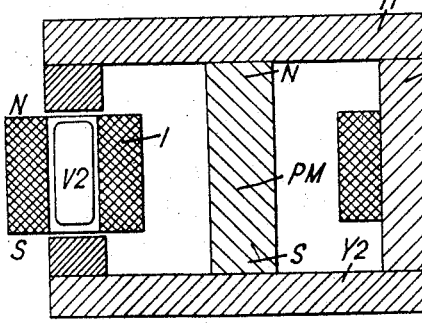
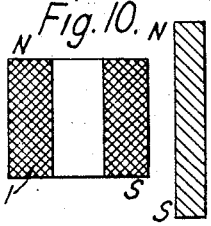
Inventors
V. J. TERRY. R. KELLY.
P. S. KELLY - W. D. CRAGG
By Philip M. Bolton
Attorney

# United States Patent Office 2,896,148
Patented July 21, 1959

2,896,148

GENERATOR REGULATED POWER SUPPLY EQUIPMENT

Victor John Terry, Richard Kelly, Patrick Stanley Kelly, and William Donald Cragg, London, England, assignors to International Standard Electric Corporation, New York, N.Y.

Application November 1, 1954, Serial No. 466,172

Claims priority, application Great Britain November 3, 1953

3 Claims. (Cl. 322—24)

This invention relates to regulated electric power supply equipment.

According to the invention, there is provided regulated electric power supply equipment which comprises magnetically-controlled means for regulating the supply of power from the said equipment to a load, a magnetically-controlled thermionic diode (as herein defined) provided with a fixed magnetic counter-bias and a controlling magnetic winding connected so as to be responsive to variations in the load voltage or load current, and coupling means arranged to be responsive to the said thermionic diode to provide an output for controlling the said magnetically-controlled means in accordance with the said variations so as to reduce them to low value.

The invention will be described with reference to the accompanying drawing which relates to a particular embodiment employing a motor-generator set for supplying power at high voltage to a telecommunication cable. It is not, however, restricted to equipment of this character or solely for this purpose, and alternative arrangements will be indicated herein.

In the drawing:

Figs. 1, 2 and 2a placed together, Fig. 2 and Fig. 2a to the right of Fig. 1, show a circuit schematic of a complete equipment;

Fig. 3 shows characteristic curves of a magnetically controlled diode, plate current v. field strength;

Fig. 4 shows curves of the controlling currents obtained from V4 and V5 in Fig. 2, v. input current to the controlling coil of the magnetic diode, under various conditions of magnetic bias;

Figs. 5–11 show various ways in which a permanent magnet magnetic-bias or a ferromagnetic flux concentrator may be applied to a magnetic diode.

Figure 1:
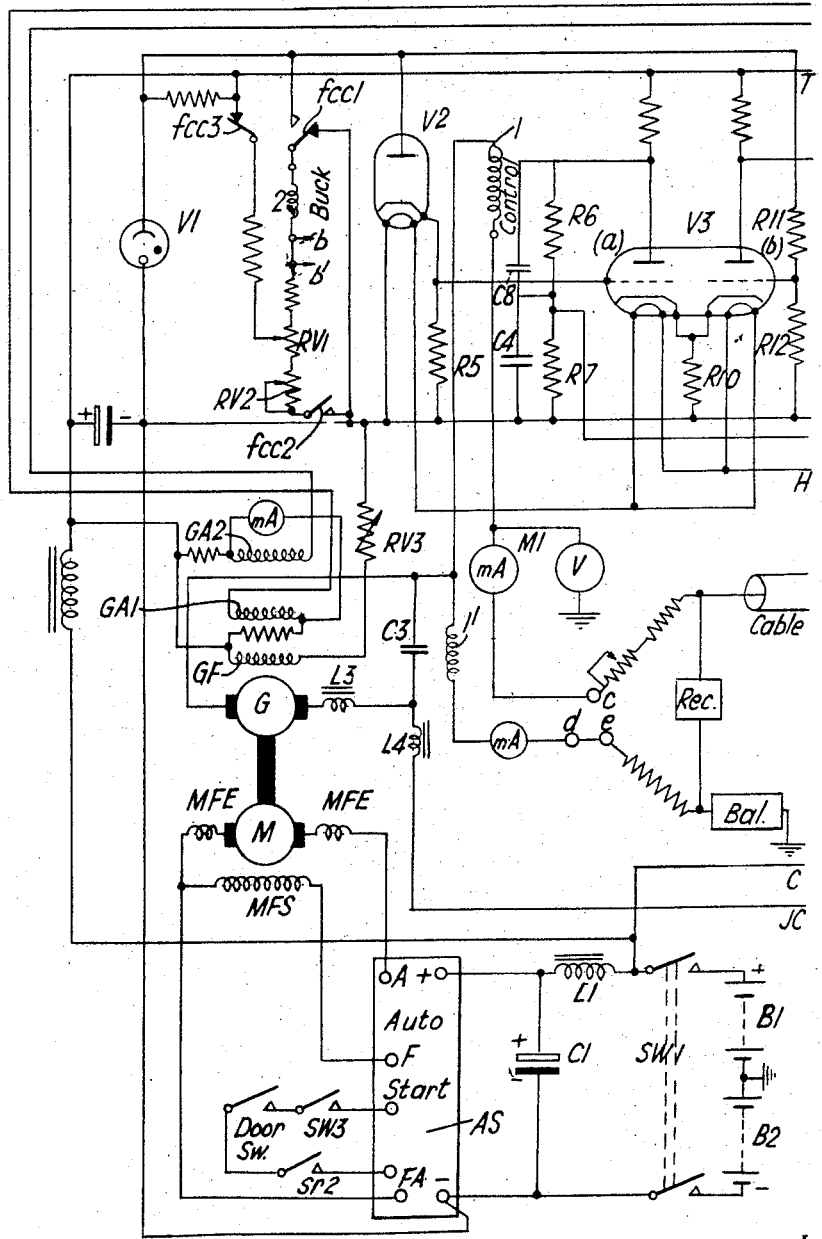
Fig. 1a shows a modification of Fig. 1.

Figs. 1 and 2 of the drawing show a power supply equipment for supplying electrical power at relatively high voltage to a submarine telegraph cable for operating a submerged telegraph repeater in the cable. Trans-oceanic submarine telegraphy operates at very slow speed, and while the object of the repeaters is to enable this speed to be increased, the conditions are nevertheless such that rapid or substantial variations or hum in the power supply cannot be tolerated for fear of their appearing to simulate signals. The regulating controls applied to the supply equipment must therefore be slow and smooth in their operation, a feature which the equipment to be described is well-suited to provide.

The equipment comprises a motor-generator set, the output current of which is maintained within close limits by means of a "magnetically-controlled thermionic diode," which is defined as a high vacuum diode the plate current of which is controllable by an axial magnetic field.

The generator has three field windings, one being the main field which supplies the normal output under normal supply conditions, while the other two fields are connected in opposition to one another, and variation of the current through these fields compensates for fluctuations in the line and supply conditions. The control of the two auxiliary fields is obtained from a push-pull amplifier circuit which in turn is controlled by the diode. The magnetic field for the diode is obtained by passing the line current to the submerged repeaters through the coil surrounding the diode. Hence a change in line current causes a change in the push-pull amplifier which in turn causes a variation of current through the two control fields causing the line current to be restored to within the prescribed limits.

*Detailed description*

Referring now to Figs. 1 and 2, a 120+120 volt battery B1+B2 with the center point earthed is employed for the generator field GF of a motor generator M—G and the electronic controlling circuit because such a battery is at present available for the telegraph supplies. In the circuit of Fig. 1 the motor M is also shown operated from this same battery, using the full 240 volts.

The output of the generator G is taken on the one side to ground via a filter comprising choke coils L3+L4 and a condenser C3, conductor JC, a relay PC1 shunted by a variable resistor RV5 and a network consisting of a pair of marginal current relays JC1 and JC2, set to different marginal values and provided with series and shunt resistors R42, R44, R45, RV4. On the other side, the generator feeds via the main control winding 1 of the magnetic diode V2 and a milliammeter M1 over a terminal c to the load, comprising, in this case, an earthed coaxial cable and its entry network. The generator may also feed via a dummy control coil 1' and a milliammeter over strapped terminals d and e to a balancing network. Such mode of operation will be referred to again.

The valve V2 which is a magnetically controlled high vacuum diode, is designed so that an increase in the magnetic field strength applied causes the anode current through the valve to be reduced, assuming a constant anode potential, which is obtained as the constant potential drop over a stabilising tube V1. Characteristic curves for a magnetically controlled diode for a number of anode voltages $E_b$ are shown in Fig. 3.

The magnetic field for V2 is derived from the windings 1 and 2, and, as previously stated, winding 1 carries the line current, but winding 2 is normally connected in such a manner that it produces a flux in the opposite sense to that of winding 1. Figs. 5–11 indicate various ways in which winding 2 may be replaced, or supplemented by ferromagnetic means. Not all of such alternatives are directly applicable to the described embodiments, as will be indicated when Figs. 5–11 are further discussed. In the present instance, winding 2 derives its supply from the stabilised supply obtaining across the stabilising tube V1 and is employing for two main purposes:

(a) To permit increased sensitivity of the control circuit; and (b) To facilitate setting up of the equipment by the adjustment of a series controlling rheostat RV2. (The terminals b and b' may be assumed connected together.)

As shown in Fig. 1, in the inoperative state, winding 2 is connected via relay back contacts fcc1 and fcc3 and rheostat RV1 to the unstabilised supply for starting purposes, in a manner to be further described.

It has been observed above that an increase in field strength due to an increase in load current results in a decrease of anode current in V2. Thus the voltage drop across R5, the cathode resistor of V2, decreases, so that the grid voltage applied to the 1st triode section (a) of V3 becomes more negative. The resulting drop in anode current through V3(a) produces an increased voltage drop across R7, and in turn the grid voltage on valve V5 (Fig. 2) becomes less negative, and V5 draws more anode current.

The reduced anode current through V3(a) also results in a reduced voltage drop across R10, thus decreasing the negative potential applied to the grid of V3(b), since the grid terminal itself is held at a fixed potential derived from the potentiometer chain R11 and R12 connected across the stabiliser tube V1. The anode current in V3(b) thus increases, and in a converse manner to that already described for V3(a) produces a more negative potential as applied to the grid of V4, and thus V4 draws less anode current.

It is therefore clear that an increase in load current results in (i) an increase in current through winding GA1 of the generator field, which is the anode load of valve V5, and (ii) a decrease in current through winding GA2 of the generator field, which is the anode load of valve V4. The generator fields are arranged in the following manner. Windings GA2 and GA1 have equal turns and are connected in opposition so that with equal currents the net field is zero. Winding GF, the main winding, is supplied from the 240 v. battery via control rheostat RV3, and is capable of providing the full load output from the generator. Windings GA2 and GA1 can each provide one-quarter of the main winding flux and therefore the range of excitation provided is from 75% to 125% of full load excitation. Winding GA2 is connected to assist winding GF. Thus it follows that an increase in load current results in a reduction in generator field excitation and therefore of generator potential difference P.D. The advantage claimed for the "buck" and "boost" windings GA2 and GA1 is that the control winding power may be easily and fairly shared between two output valves V4 and V5 of the amplifier.

The heater power for the valves is obtained from the negative half of the 120 v. battery, the valve filaments being connected in series (and series-parallel) via conductor H with R26 as the final dropping resistor. By using high voltage filaments, very little power is dissipated in R26.

The remainder of the circuit principally in Fig. 2, consists of controlling and starting equipment, and provision for alternative methods of working.

To dispose of the last point first, the transmission of power to the cable can be made balanced or unbalanced. In the former case, the arrangement described above is used of feeding parallel to the cable and to a balancing network; the block REC represents the telegraph receiver. For unbalance working, the terminals shown as d and e in Fig. 1 are disconnected, terminal c is strapped to e, and R42 in the JC circuit (Fig. 2) reduced in value (by shunting or otherwise) to adjust the current in the JC circuit to a correct value for the changed conditions.

For starting from the cold, it is the practice to apply the current to the cable and repeaters thereon in at least two stages, a first stage consisting of a warming-up current at low value e.g. about half of normal current, to warm up the heaters of the thermionic tubes so as to avoid the sudden shock of the full normal voltage when the heaters are cold and at low resistance, only thereafter applying the full voltage, and generally after a predetermined time controlled by a delay relay, timing switch or the like. Two stages at intervals of one-half to one-minute are normally sufficient. This feature is under the control of relays FCC and PC in Fig. 2.

When switch SW1 is closed preparatory to starting up the equipment, the full battery B1+B2 of 240 volts is applied through a filter circuit L1, C1, to an autostart device A for starting up the motor of the motor generator set, M—G. This operates on well-known principles, in association with a manual start switch SW3, a door-switch, and a start relay contact sr2 to close certain contactors to apply voltage to the field (F) and armature (a) terminals in due course. However, relay SR must first operate, and the closure of SW1 is also effective to apply the full battery to tubes V1—V5, the positive half of the battery (B1) to tubes V6, V7, and the negative half (B2) to the heaters of tubes V1—V5 (from earth via R2b and dcr1 back) preparatory to SR operating.

While the heaters of the control circuit tubes are heating up, the application of full battery B1+B2 to the +line T causes C6 to charge via R24 and eventually, when the potential of C6 has risen to a suitable value, V6, a cold cathode gas discharge device, will fire and operate relay DCR on the discharge current of Cb. Operation of DCR is effective, at dcr1, to remove a short circuit from SR, and at dcr2 to short circuit R26, to compensate for the change of resistance due to the introduction of SR into the circuit.

The application of positive battery to lead C (via SW1) causes LC and VLC relays to operate, since the relays JC1 and JC2 are both deenergized and hard over on their left hand contacts, there being, as yet, no load current. The operations of these relays LC and VLC at this stage are, however, ineffective, except for giving alarm and signal indications. The two contacts lc1 and lc2 of LC are both in alarm and signal circuits, as also are vlc2 and vlc, while vlc1 opens up the circuit of PSD to prevent shut down on very low current during starting up, when relay SR operates and closes sr1, and vlc3 prepares a short circuit for SR when psd2 may subsequently operate under emergency conditions.

However, SR now operates, and, as just stated, sr1 is ineffective except in preparing an operate circuit for PSD, sr3 is in an indication circuit while sr2 forms part of the autostart prepare circuit, as previously referred to. On the assumption that SW3 and the door switch are already closed, contactors will operate in due order to start the motor-generator, and current will be supplied gradually to the load.

Under these initial conditions, relay FCC in the circuit of gas valve V7 is not yet operated, and as a result, winding 2 ("Buck") of V2 is energised from the full and + battery line via fcc3 and fcc1 in a direction to aid the control winding 1, thereby stabilising the generator output current at a low value suitable for giving the line repeaters a preliminary warming-up. Relay PC in the generator earth circuit now operates, and at its single contact pc1 energises the anode of valve V7 and also the triggering circuit therefore, R25—C7, and as in the case of V6, when the potential of C7 has risen to a suitable value, V7 will fire, operating FCC.

The operation of FCC at its contacts 1, 2, 3, causes the current in winding 2 of V2 to be reversed to a truly bucking direction and to be derived from the stabilised supply across regulator tube V1 (which is also used to supply V2 anode and V3 (b) grid); fcc4 alters the grid circuit conditions of V4, by de-shunting R15 from across R14; and fcc5 breaks an indicator circuit.

In regard to the change over of fcc4 and the de-shunting of R15, when the unit is first switched on, SR is held off, as described, until the heaters of the control portion are up to normal temperature, and since under these conditions there is no generator output, V4, as described, will be fully conducting so as to give full boost conditions on the generator at winding GA2. Thus, when the motor is eventually started by SR operating; a rapid rise of output current will result which may produce an undesirable surge owing to the time constant of the control unit. To obviate this, the boost valve V4 is initially biassed back by the described arrangement of shunting R14 with a lower resistor, R15, by means of the contact fcc4.

The line current will now be regulated in the manner described above by means of V2, V3, V4 and V5 while the marginal relays JC1 and JC2 are used primarily for supervisory and emergency control purposes. Under normal conditions, with correctly adjusted load current and the marginal relays set accordingly, the relay armatures float clear of their L and H contacts. The release of relay VLC as the load current rises, closes at vlc1 the operating circuit of relay PSD, sr1 being operated, and PSD operating provides a holding circuit for itself at psd1, and psd2 prepares a very-low-current shut-down circuit in series with vlc3.

When the load current wanders a little high or low, as the case may be, relay HC or LC will be energised over contacts of C2 of marginal relay JC2, and supervisory alarms and indications only are given; hc3 operating disables LC.

Under abnormal load circuit conditions, however, of short circuited or open circuited line, generator failure or the like, VHC or VLC will operate, in addition over contacts jc1 of marginal relay JC1.

For very high currents VHC and HC operate, giving alarm indications at vhc3 and hc2; vhc1 disables VLC, vhc4 short-circuits SR, and vhc2 provides a holding circuit for VHC and via MR1 for HC, thus avoiding an additional relay contact. The short-circuiting of SR causes its release, opening the auto-start circuit at sr2 (which causes current to be removed from terminals FA); sr3 opens a normally-indicating supervisory circuit; and sr1 is ineffective.

Current is thus removed from the load, but not from the control circuit. V7, however, is open-circuited at pc1, and thus restored to normal, since PC releases, but PSD can only be restored to normal by shutting down the control unit, and this is normally done in case of breakdown or emergency shut-down as a routine before restarting.

In the case of a very low current fault, relays VLC and LC operate, giving alarm indications at vlc2 and lc2; vlc3 in series with psd2 short-circuits SR; vlc4 opens a normally-operating supervisory circuit; and vlc1 is ineffective.

Release proceeds as before, and complete shut down is necessary before restarting.

In the circuit of relays JC1, JC2, the earth tapping on sensitivity adjuster RV4 is confirmed by R45, high in comparison with R44+RV4, in case the tapping on RV4 or RV4 itself goes open-circuited.

Adjustable resistance RV3 controls the generator mainfield current, and RV1 and RV2 the bias winding of the V2 buck winding 2.

Various methods may be employed to provide the magnetic field for a magnetic diode. The simplest method is to use a single winding such as 1. To improve the sensitivity, winding 2 has been shown added in opposition to winding 1, and supplied with a constant current. The turns on winding 1 have therefore to be increased to restore the normal nominal field strength. The sensitivity is therefore increased by the ratio of the increased number of turns on winding 1 to the previous number of turns.

The magnetic diode should not be biased back by this static field device beyond the horizontal section of its anode current-field strength characteristic, that is, for nominally negative values of H in Fig. 3. The diode is not susceptible to the direction of the applied magnetic field but only to its magnitude, and hence the characteristics are symmetrical about the ordinate at zero. Biasing back unduly is likely to lead to difficulty in starting up, but this is also dependent to a certain extent on the relative excitation strengths of the generator field windings.

It should be noted in passing, however, that oppositely directed fields applied together are not additive in their separate effects on the diode current, but subtractive, because of the mutual cancellation of magnetic field.

The opposition, or biasing, winding 2 of V2 may be replaced by a permanent magnet arrangement, supplemented by a small winding to allow for fine adjustment, and for ageing. Moreover, the presence of iron near the field windings of V2 will increase the magnetic induction (B), and this provides a means for affording fine control of the diode current, by means of a screw adjustment of a soft iron core. Such alternatives will not be useful without modification in the described embodiments employing two-stage control of load current.

The overall characteristic of the amplifier as a controlling device, in terms of line current through winding 1 of V2 v. V4 and V5 anode currents, is shown in Fig. 4, where (i) the continuous curves relate to the use of the single winding 1 only, of 1500 turns; (ii) the dashed curves relate to the use of double windings, the winding 1 having 2100 turns and winding 2 have 800 turns carrying 176 milliamps in opposition; and (iii) the chain-dotted curves relate to a similar arrangement as in (ii) but with the winding 2 carrying a reduced current of 48 milliamps but supplemented by a permanent magnet.

Curves (ii) and (iii) show a substantial improvement in sensitivity of the control over the arrangement with a single winding as shown in the curves (i).

V3 has been shown in Fig. 1 as a double-triode type of tube, but if it is replaced by separate tubes, a wider choice of types becomes available, including pentodes, thus permitting the overall gain of the amplifier to be increased.

Figs. 5–11 illustrate various ways in which a permanent magnet or magnetic material may be applied to a diode, shown throughout as V2.

In Fig. 5, the diode, V2, is shown surrounded by its control coil 1, and set between mild steel pole pieces PP, attached to the poles of a permanent magnet PM. Fig. 5A shows the arrangement in plan. Suitable for two-stage control by switching on the winding 1. A second winding could however be added.

Fig. 6 shows the converse arrangement, whereby the tube is set between two permanent magnets PM which are bridged by a mild steel yoke Y, so as to be effectively in aiding relationship, as indicated by the north (N) and south (S) markings associated with the magnets (the direction N–S is, of course, purely arbitrary). Similar remarks apply re two stage control.

If the magnets of Fig. 6 are not used, and the yoke is made in the form of a C, as shown in Fig. 7, then one of several possible arrangements is achieved for increasing the induction B by the use of iron alone. One other arrangement of this type is shown in Fig. 8, where the controlling coil 1 is surrounded by an iron ring 6, which has the effect of decreasing the reluctance of the magnetic circuit, and so increasing the induction. The ring becomes magnetically polarised by induction from the coil and with opposing poles. Such arrangements are unsuitable for two-stage control, except by the addition of a second winding.

Figs. 9 and 10 show an arrangement in which the controlling coil is surrounded by a ring-shaped magnet, N on one plane face and S on the other, and so applied as to aid or oppose the coil.

In Fig. 9, where the magnet field and coil fields oppose, the lines of force due to the magnet and the coil traverse the centre of the coil in the same direction, and so aid, whereas in Fig. 10, there is mutual repulsion between the lines of force from the two magnetic sources, and cancellation of field within the coil. Similar remarks as for Figs. 5 and 6 apply re two-stage control.

Finally, Fig. 11 shows another arrangement for combining a permanent magnet and an auxiliary controlling winding, wherein a permanent magnet PM bridges two mild steel yokes Y1 and Y2, embracing the tube V2 between one pair of ends, and a mild steel bridging bar BB carrying the auxiliary winding 2 between its other ends. BB must, however, be gapped to avoid a magnetic short-circuit on PM, and this may be provided at its junction with Y1 and/or Y2.

The controlling winding 1 is here shown as opposing the permanent magnet, while winding 2 is shown as aiding it, and therefore diverting more, or less, of the flux from the magnet from the path including the tube.

The use of a magnetically controlled diode for regulation in this type of equipment offers several advantages:

(1) The amplifier, and the feedback controlling circuit from V4 and V5, are both electrically isolated from the main load circuit. Thus, the load circuit may operate at a terminal voltage of, say, 600 volts, or more, but the control circuit as a whole remains within the limits of the control circuit operating voltage, in this embodiment, ±120 volts from earth potential.

It would not be desirable in general to connect the control winding 1 of V2 in the load circuit earth side (lead to L2) owing to the possible influence of strays, leaks and the like.

(2) Very little power is required from the main load circuit to operate the feedback control, and by the use of current shunts at the take-off point and/or adjustment of the number of turns in winding 1, a very wide range of load currents can be controlled.

(3) The diode is readily controllable by, and may readily control, many variables, each being fed to a separate controlling winding and thus kept electrically isolated.

In cases where there is a largely capacitive load, e.g. telegraph cables, it is not desirable to have a quick response from the amplifier, for reasons stated above. This can be controlled by the capacitors C4 and C5, whereby the time constant of the circuit may be increased to several seconds with quite smallish capacitors. There are, however, a number of factors in the circuit which produce phase lags, namely, capacitors C4 and C5, the inductance of generator field windings GA1, GA2 and GF, the series inductance of the generator and the inductance of the control winding 1 of the diode. These factors will all produce a maximum phase lag of 90° (very nearly) at some particular frequency, each one starting at zero with zero frequency, rising to its peak, then falling away to zero again.

For stable operation of the circuit, the sum of these phase lags at any particular frequency should not be greater than 180° and preferably not greater than 90°. Capacitors C8 and C9 provide phase advance and are chosen to fulfill this object, but are not essential.

The foregoing description relates to the use of the magnetic diode as a means of obtaining a constant current output, but it may easily be adapted for other types of control, namely:

(1) A constant voltage output. In this case the winding 1, with suitable adjustment of coil resistance and turns value, would be connected in shunt with the load. In cases of higher voltage loads, where the coil resistance could not satisfactorily be built out to the required voltage, in order not to de-sensitise the control by adding series padding resistance, a series stabiliser or a number of stabilisers may be used, as indicated in Fig. 1A, where the stabiliser S1 absorbs 300 volts of steady voltage, leaving all the variations, e.g. ±60 volts, appearing across the voltage applied to the coil.

(2) By adding additional control windings the diode may be used to provide constant current with over-voltage protection or constant voltage with over-current protection (compounding).

Although the foregoing description refers to a battery supplied unit, a similar form of control may be applied to an A.C. mains power supplied unit, using a motor generator or dry plate rectifier as the regulating means. In this case fluctuations in the mains supply voltage may be corrected by a separate control winding on the diode.

Since the control by magnetic diode in a suitable amplifier is essentially static in its nature, as opposed to a dynamically-controlled supply unit using motor-driven controlling means, the diode circuit may be applied with small modification to many supply devices employing static regulation, e.g. a saturable reactor (transductor) power unit, wherein one or more of the auxiliary control windings are controlled by the diode circuit; or to thyratron-controlled supply units.

While the principles of the invention have been described above in connection with specific embodiments, particular modifications thereof, it is to be clearly understood that this description is made only by way of example and not as a limitation on the scope of the invention.

What we claim is:

1. A regulated electric equipment for supplying power to a load circuit comprising a generator having a main magnetic field winding for supplying an excitation flux for said generator, two auxiliary magnetic field windings, one for supplying a booster excitation flux and the other for supply a bucking excitation flux for said generator, a circuit comprising a magnetically controlled thermionic diode having a magnetic biasing means and a magnetic control winding, said biasing means and said control winding normally producing opposed magnetic fluxes, a push-pull amplifier having input circuits and two independent output circuits, one of said independent circuits comprising said booster flux winding, the other independent circuit comprising said bucking flux winding, circuit connections between said diode circuit and the input circuits of the push-pull amplifier and means coupling said control winding to said load circuit so as to be responsive to electrical variations therein, whereby said electrical variations control the power supplied to said load.

2. Equipment as claimed in claim 1 further comprising delay means responsive to the application of operating power to cause the said magnetic biasing means to be changed to a different value after a predetermined interval of time, thereby to change to a higher value the value of the power applied to the load circuit and controlled by the said diode.

3. Equipment as claimed in claim 2 in which said magnetic biasing means comprising an auxiliary winding and means responsive to said delay means is provided for reversing the bias current flowing in auxiliary winding.

References Cited in the file of this patent

UNITED STATES PATENTS

| | | |
|---|---|---|
| 2,124,682 | Spencer | July 26, 1938 |
| 2,352,231 | Stratton | June 27, 1944 |
| 2,616,072 | Edwards et al. | Oct. 28, 1952 |
| 2,662,980 | Schwede | Dec. 15, 1953 |